US008682176B2

(12) United States Patent
Xie

(10) Patent No.: US 8,682,176 B2
(45) Date of Patent: Mar. 25, 2014

(54) OPTOELECTRONIC PROCESSING APPARATUS AND METHODS FOR PROCESSING CONSTRAINT INFORMATION

(75) Inventor: Gang Xie, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 95 days.

(21) Appl. No.: 13/259,987

(22) PCT Filed: Apr. 19, 2010

(86) PCT No.: PCT/CN2010/071890
§ 371 (c)(1), (2), (4) Date: Feb. 13, 2012

(87) PCT Pub. No.: WO2011/017932
PCT Pub. Date: Feb. 17, 2011

(65) Prior Publication Data
US 2012/0134683 A1    May 31, 2012

(30) Foreign Application Priority Data
Aug. 13, 2009    (CN) .......................... 2009 1 0166128

(51) Int. Cl.
*H04B 10/00*    (2013.01)
(52) U.S. Cl.
USPC .............................. 398/175; 398/25; 398/177
(58) Field of Classification Search
USPC ................................................. 370/389–539
See application file for complete search history.

(56) References Cited

U.S. PATENT DOCUMENTS

| 8,290,366 | B2 * | 10/2012 | Lee et al. .......................... 398/57 |
| 2005/0286521 | A1 * | 12/2005 | Chiang et al. .................. 370/389 |
| 2007/0065159 | A1 | 3/2007 | Kuksenkov et al. |
| 2007/0076769 | A1 * | 4/2007 | Zou ................................. 370/539 |
| 2007/0292129 | A1 * | 12/2007 | Yan et al. ........................... 398/5 |
| 2011/0033183 | A1 * | 2/2011 | Doverspike et al. ............. 398/49 |

FOREIGN PATENT DOCUMENTS

| CN | 1539214 A | 10/2004 |
| CN | 101005320 A | 7/2007 |
| CN | 101189836 A | 5/2008 |
| CN | 101227248 A | 7/2008 |
| CN | 101499820 A | 8/2009 |
| EP | 1383255 A2 | 1/2004 |

OTHER PUBLICATIONS

PCT International Search Report for PCT/CN2010/071890 dated Jul. 22, 2010.
Office Action in Chinese Patent Application No. 200910166128.4, mailed on Jul. 19, 2013.

* cited by examiner

*Primary Examiner* — Li Liu
(74) *Attorney, Agent, or Firm* — Nixon Peabody LLP; Joseph Bach, Esq.

(57) ABSTRACT

The invention provides an optoelectronic processing apparatus and methods for processing constraint information. The optoelectronic processing apparatus is applied to the optical transport network OTN device, and comprises: a 3R regeneration unit for reamplifying, reshaping and retiming a signal; a wavelength conversion unit for performing wavelength conversion to the signal; an interlayer adapting unit for converting the signal between the OCh layer and the ODUk layer; and a dispatching unit for dispatching the 3R regeneration unit, the wavelength conversion unit and the interlayer adapting unit according to a function identification parameter of the optoelectronic processing apparatus so as to process the signal. By the present invention, the management of the OTN device is simplified, and the 3R regeneration, wavelength conversion and optoelectronic interlayer adaptation information are managed uniformly.

13 Claims, 4 Drawing Sheets

OPTOELECTRONIC PROCESSING APPARATUS AND METHODS FOR PROCESSING CONSTRAINT INFORMATION

CROSS-REFERENCE TO RELATED APPLICATIONS

This application is a National Phase of International Application No. PCT/CN2010/071890, which was filed on Apr. 19, 2010, and which claims priority to and the benefit of Chinese Patent Application No. 200910166128.4, filed on Aug. 13, 2009, and the disclosures of which are hereby incorporated herein by reference in their entireties.

FIELD OF THE INVENTION

The invention relates to the field of communication, and in particular to an optoelectronic processing apparatus and methods for processing constraint information.

BACKGROUND OF THE INVENTION

With the fast development of services such as wideband, internet protocol (IPTV) and video data transmission, new requirement for transport network is brought forward. The transport network should not only provide wide bandwidth, but also have flexible dispatch capability and perfect operation administration and maintenance (OAM) function. The transport network in relative technologies mainly uses synchronous digital hierarchy (SDH) technology or wavelength division multiplexing (WDM) technology. Both of the two technologies have advantages and disadvantages.

SDH technology mainly processes electric layer signal, whose advantage lies in flexible dispatch capability, rich protection function and perfect OAM. However, the current maximal dispatch granule of SDH is virtual container VC4 with relatively small dispatch granule, which cannot satisfy the increasing service demands. The WDM technology mainly processes optical layer signal, and provides large bandwidth by multiplexing a plurality of wavelengths. However, there is physical limitation in the optical layer process, such as photo damage, wavelength conversion and so on, therefore it does not have flexible dispatch capability and rich protection function of the electric layer signal process. Hence, the WDM technology is generally used in point-to-point or ring network scene.

Aiming at the respective disadvantages of SDH and WDM, the International Telecommunications Union-Telecommunications standardization sector (ITU-T) provides new transport hierarchy frame-optical transport network (OTN). The OTN technology comprises optical layer and electric layer. Network survivability mechanism exists in either layer, and there is a corresponding management monitoring mechanism between the optical layer and the electric layer to solve the above described problems. Meanwhile, the OTN network provides strong OAM function, and can perform flexible dispatch to the services with different granules when relatively large bandwidth is provided.

Though the OTN technology solves the respective disadvantages of SDH and WDM technologies, it brings a new problem as well: the optoelectronic interlayer adapting problem. In an OTN apparatus, when establishing an optical channel (OCh) layer network connection, because of the limitation of the wavelength, to realize such functions as optic-electric-optic (O-E-O) wavelength conversion, and the regeneration of reamplifying, reshaping and retiming (3R), service signal need to pass through OCh→optical channel transport unit k (OTUk)→optical channel data unit k (ODUk)→OCh. But if the service signal passes through the optical and electric layers, the signal will need to pass through (OCh)→(OTUk)→ODUk, or ODUk→(OTUk)→OCh. Therefore, OCh/OTUk can be used as OTN interlayer processor.

The current technology of OTN device management describes the functions of wavelength conversion, 3R regeneration, conversion between optical layer service signal and electric layer service signal in different scenes, For instances, the wavelength converter functions as the wavelength conversion information in wavelength switch optical network (WSON) model; OCh and ODUk interlayer adapter functions as the multiple layer network/multiple region network (MRN/MLN) interlayer adapting information. The information is abstracted respectively and is not associated, so that the management and maintenance of information is complicated.

SUMMARY OF THE INVENTION

Aiming at the problem of the complex management and maintenance of information caused by describing the conversion functions of the wavelength conversion, 3R regeneration, conversion between optical layer service signal and electric layer service signal in different scenes in relative technologies, this invention is provided. Therefore, the present invention provides an improved optoelectronic processing apparatus to solve the above problem.

An optoelectronic processing apparatus is provided according to one aspect of the invention.

The optoelectronic processing apparatus according to this invention is applied to the optical transport network OTN device, and comprises: a reamplifying/reshaping/retiming 3R regeneration unit for reamplifying, reshaping and retiming the signal; a wavelength conversion unit for performing wavelength conversion to signal; an interlayer adapting unit for converting the signal between the optical passage OCh layer and the optical data unit ODUk layer; a dispatching unit for dispatching the 3R regeneration unit, the wavelength conversion unit, and the interlayer adapting unit according to the function identification parameter of the optoelectronic processing apparatus to process the signal.

Preferably, the optoelectronic processing apparatus is further used for managing and processing the signal according to constraint information among the links, wherein the constraint information comprises at least one of the followings: the processor function identification parameter of the optoelectronic processing apparatus, the input wavelength range, the output wavelength range, the coding format of the wavelength bearer signal, the rate of the wavelength bearer signal and the status of the optoelectronic processing apparatus.

Preferably, the dispatching unit is used for dispatching the 3R regeneration unit to process the signal when the value of the function identification parameter is 3R regeneration so as to describe the 3R regeneration ability of the optoelectronic processing apparatus.

Preferably, the dispatching unit is used for dispatching the wavelength conversion unit to process the signal when the value of the function identification parameter is wavelength conversion so as to describe the wavelength conversion ability of the optoelectronic processing apparatus.

Preferably, the dispatching unit is used for dispatching the interlayer adapting unit when the value of the function identification parameter is optoelectronic interlayer adaption so as to describe the optoelectronic interlayer adapting ability of the optoelectronic processing apparatus.

Preferably, the optoelectronic processing apparatus is specifically used for performing 3R regeneration, wavelength conversion or optoelectronic interlayer adapting function of signal when the coding manner and the rate of the signal provided are the same as the coding manner and rate of the wavelength bearer signal.

Preferably, the optoelectronic processing apparatus also comprises a photo damage calculating unit for recalculating the photo damage of the signal after the signal is processed by 3R regeneration unit or wavelength conversion unit.

Preferably, the photo damage calculating unit is further used for starting to calculate the photo damage of the signal after converting the signal from ODUk layer link through ODUk, converting the signal from ODUk layer to OCh layer by the interlayer adapting unit and then converting from OCh to the OCh link.

Preferably, the photo damage calculating unit is further used for stopping calculating the photo damage of the signal after converting the signal from OCh layer link through OCh, converting the signal from OCh layer to ODUk layer by the interlayer adapting unit and then converting from ODUk to the ODUk link.

To realize the above purpose, another aspect of this invention provides a processing method for constraint information.

The processing method for constraint information according to this invention comprises that: when the node which the optoelectronic processing apparatus belongs to establishes connection with other nodes, the node floods the constraint information managed by the optoelectronic processing apparatus, calculates the route and verifies the constraint information hop-by-hop according to the route, wherein the optoelectronic processing apparatus is used for managing and processing the signal according to the constraint information between links. The constraint information comprises at least one of the followings: the processor function identification of the optoelectronic processing apparatus, the input wavelength range, the output wavelength range, the coding format of the wavelength bearer signal, the rate of the wavelength bearer signal and the status of the optoelectronic processing apparatus; the optoelectronic processing apparatus comprises: a 3R regeneration unit for reamplifying, reshaping and retiming the signal; a wavelength conversion unit for performing wavelength conversion to the signal, an interlayer adapting unit for converting the signal between the OCh layer and the ODUk layer; and a dispatching unit for dispatching the 3R regeneration unit, the wavelength conversion unit and the interlayer adapting unit according to the function identification parameters of the optoelectronic processing apparatus so as to process the signal.

To realize the above purpose, another aspect of this invention provides a processing method for constraint information.

The processing method for constraint information according to this invention comprises that: when the node which the optoelectronic processing apparatus belongs to establishes connection with other nodes, the connected source node calculates the route, and each node in the route verifies the constraint information, wherein the optoelectronic processing apparatus is used for managing and processing the signal according to the constraint information between links. The constraint information comprises at least one of the followings: the processor function identification of the optoelectronic processing apparatus, the input wavelength range, the output wavelength range, the coding format of the wavelength bearer signal, the rate of the wavelength bearer signal and the using of the optoelectronic processing apparatus; the optoelectronic processing apparatus comprises: a 3R regeneration unit for reamplifying, reshaping and retiming the signal; a wavelength conversion unit for performing wavelength conversion to the signal, an interlayer adapting unit for converting the signal between the OCh layer and the ODUk layer; and a dispatching unit for dispatching the 3R regeneration unit, the wavelength conversion unit and the interlayer adapting unit according to the function identification parameters of the optoelectronic processing apparatus so as to process the signal.

By application of this invention, the 3R regenerating ability, the interlayer adapting ability and the wavelength converting ability are described in the manner of optoelectronic processor information mode uniformly, which solves the problem of complex management and maintenance of information caused by describing the conversion functions of the wavelength conversion, 3R regeneration, conversion between optical layer service signal and electric layer service signal in different scenes in relative technologies, so as to simplify the management of the OTN device and manage the 3R regeneration, the wavelength conversion and the optoelectronic interlayer adaptation information uniformly.

BRIEF DESCRIPTION OF THE DRAWINGS

Drawings, provided for further understanding of the present invention and forming a part of the specification, are used to explain the present invention together with embodiments of the present invention rather than to limit the present invention, wherein.

DETAILED DESCRIPTION OF EMBODIMENTS

Figure 1:
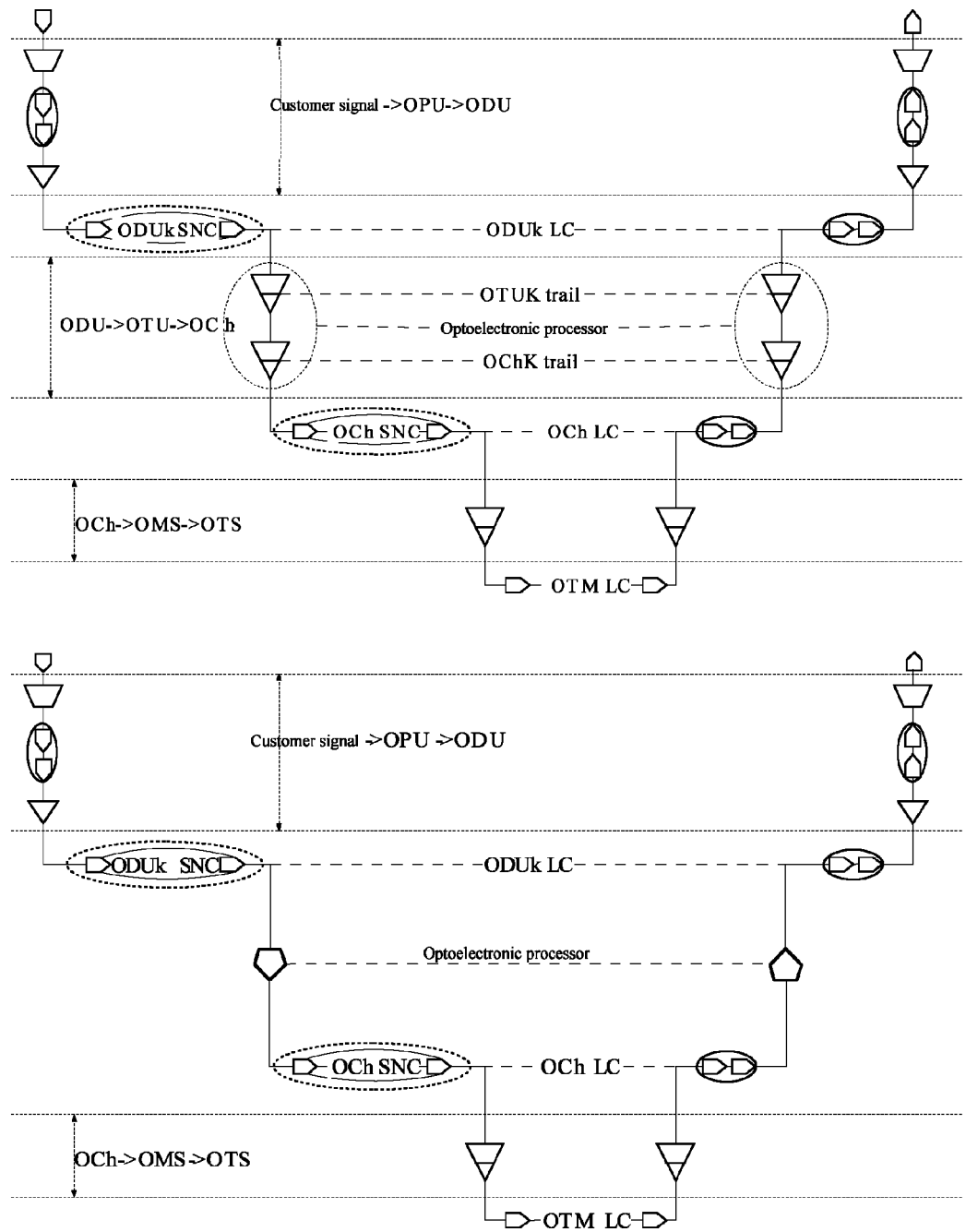
FIG. 1 shows a diagram of OTN hierarchy structure according to the embodiments of this invention.

In consideration of the problem of complex management and maintenance of information caused by describing the conversion functions of the wavelength conversion, 3R regeneration, conversion between optical layer service signal and electric layer service signal in different scenes in relative technologies, the embodiments of this invention provide an optoelectronic processing apparatus, which is applied to OTN device. Namely, an optoelectronic interlayer processor model of OTN apparatus is provided. The relative functions of the OTN apparatus are unified when processing the optoelectronic conversion by introducing the model. The relative functions comprise wavelength conversion, 3R regeneration and conversion between optical layer service signal and electric layer service signal so as to simplify the management of OTN apparatus, accomplishing the purpose of managing 3R regeneration, wavelength conversion and optoelectronic interlayer adapting information uniformly. The optoelectronic processing apparatus (namely, optoelectronic processor) realizes the functions of: 3R regeneration for reamplifying, reshaping and retiming the signal; wavelength conversion for performing wavelength conversion to the signal; and interlayer adaptation for converting the signal between the OCh layer and the ODUk layer.

It should be noted that the embodiments in this application and the features of such embodiments can be combined with each other, when they do not conflict with each other. This invention is described in details hereafter with reference to the drawings and in combination with the embodiments.

In the following embodiments, the step shown in the flowchart of the drawings may be executed in the computer system of a group of computer-executable instructions, and, though the flowchart shows logic order, the shown or described steps may be executed in the order different from the shown order in some cases.

According to the embodiments of this invention, an optoelectronic processing apparatus (namely, optoelectronic processor) applied to the OTN apparatus is provided, wherein the optoelectronic processing apparatus comprise: a 3R regeneration unit, a wavelength conversion unit, an interlayer adapting unit, and a dispatching unit. The function of the apparatus is described in details hereafter.

The 3R regeneration unit is for providing 3R regeneration ability for reamplifying, reshaping and retiming the signal; the wavelength conversion unit is for providing wavelength converting ability for performing wavelength conversion to the signal; and the interlayer adapting unit is for providing interlayer adapter function for converting the signal between the OCh layer and the ODUk layer.

The optoelectronic processing apparatus manages and processes the signal according to the constraint information between the links. The constraint information includes: the function identification parameter of the optoelectronic processor, the input wavelength range, the output wavelength range, the coding format of the wavelength bearer signal, the rate of the wavelength bearer signal and the status of the optoelectronic processor.

Wherein, when the processor function identification parameter value in the optoelectronic processor information is 3R regeneration, it is used for describing the 3R regeneration ability of the optoelectronic processor (namely, the dispatching unit dispatches 3R regeneration unit to process the signal); when the processor function identification parameter value in the optoelectronic processor information is wavelength conversion, it is used for describing the wavelength conversion ability of the optoelectronic processor (namely, the dispatching unit dispatches 3R regeneration unit to process the signal); when the processor function identification parameter value in the optoelectronic processor information is optoelectronic interlayer adaptation, it is used for describing the optoelectronic interlayer adapting ability of the optoelectronic processor (namely, the dispatching unit dispatches 3R regeneration unit to process the signal). When the processor function identification parameter value in the optoelectronic processor information is the combined value of the 3R regeneration, the wavelength conversion or optoelectronic interlayer adaptation, it is used for describing the combined ability of the 3R regeneration, the wavelength conversion or optoelectronic interlayer adaptation of the optoelectronic processor (namely, the dispatching unit dispatches the combination of the above units to process the signal).

Preferably, the optoelectronic processing apparatus is used for performing 3R regeneration, wavelength conversion or optoelectronic interlayer adapting function of signal when the specifically provided a coding manner and a rate of the signal are the same as the coding manner and rate of the wavelength bearer signal.

Preferably, the apparatus further comprises photo damage calculating unit for recalculating the photo damage of the signal after the signal is processed by 3R regeneration unit or wavelength conversion unit. The photo damage calculating unit is further used for starting to calculate the photo damage of the signal after converting the signal from ODUk layer link through ODUk, converting the signal from ODUk layer to OCh layer by the interlayer adapting unit and then converting from OCh to the OCh link; the photo damage calculating unit is further used for stopping calculating the photo damage of the signal after converting the signal from OCh layer link through OCh, converting the signal from OCh layer to ODUk layer by the interlayer adapting unit and then converting from ODUk to the ODUk link.

To better describe the embodiments, the devcices referred in the embodiments are described hereinafter.

An optical cross matrix: the optical cross matrix is mainly used for converting the OCh signal. Typical optical cross matrix devices include Fixed ADD Drop Multiplexer (FOADM), Reconfigurable ADD Drop Multiplexer (ROADM), Optical Cross Connect (OXC), Photonic Cross Connect (PXC) and so on, wherein FOADM, ROADM and OXC cannot ensure all-wavelength conversion because of the limitation of the appliances.

An electric cross matrix: the electric cross matrix is mainly used for converting the ODUk signal.

An optoelectronic processor: namely, optoelectronic processing apparatus, is for performing conversion process of optoelectronic signal, comprising 3R regeneration ability, optoelectronic adapting ability, wavelength conversion ability and so on. According to different application scenes, the optoelectronic processor comprises different functions. The optoelectronic processor mainly comprises the following three functions:

Function one: as a 3R regenerator of the OTN apparatus, namely 3R regeneration unit, wherein the pure optical apparatus only has the function of regeneration (1R) (the typical appliance is the optical amplifier) and the function of regeneration and reshaping (2R) (the typical appliance is the all-optical wavelength converter) for it is limited by the current optical appliance. If it needs 3R (amplifying, reshaping and retiming) function, O-E-O manner is needed. When the optoelectronic processor is used as 3R regenerator, the relative parameter for function description comprises: wavelength range, coding manner of the wavelength bearer signal and the rate of the wavelength bearer signal.

Function two: as a wavelength converter of the OTN apparatus, namely wavelength conversion unit, wherein, the current pure optical wavelength converter is immature in technology so that the pure optical wavelength converter cannot be applied to the OTN apparatus practically. Therefore, the current OTN apparatus still performs wavelength conversion in the O-E-O manner if the conversion is needed. The relative parameters for function description when the optoelectronic processor is used as the wavelength converter comprise: the input wavelength range, the output wavelength range, the coding format of the wavelength bearer signal and the rate of the wavelength bearer signal.

Function three: as an OCh and ODUk interlayer adapter of the OTN apparatus, namely interlayer adapting unit. Because the OTN apparatus has both the interface switch ability-wavelength switch ability (LSC) of the optical layer and the electric layer and time division multiplexing (TDM), the OTN apparatus needs to manage the two switch abilities at the same time. When the service signal passes through the optical and electric layers, the service signal needs to be converted between the OCh layer and the ODUk layer. The relative parameters for function description when the optoelectronic processor is used as the OCh and ODUk interlayer adapter comprise: the input wavelength range, the output wavelength range, the coding format of the wavelength bearer signal and the rate of the wavelength bearer signal.

Because the relative parameters in the above functions are similar to each other, the above functions are described uniformly by employing a optoelectronic processor information model. The relative parameters comprise: the optoelectronic processor function identification parameter, the input wavelength range, the output wavelength range, the coding format of the wavelength bearer signal, the rate of the wavelength bearer signal and the using of the optoelectronic processor, wherein the processor function identification parameter is used for instructing the processor to realize one or more functions. The relative parameters in the 3R regenerator only have wavelength range, and no input wavelength range or output wavelength range. But for the purpose of uniform definition, the definition of the input wavelength range and the output wavelength range are used when describing 3R regenerating function, and the input wavelength range takes the same value as the output wavelength range.

The implementing process of the embodiments of this invention is described in details hereafter in combination with examples.

FIG. 1 shows a diagram of OTN hierarchy structure according to the embodiments of this invention, wherein the upper half in FIG. 1 is an adapting and terminating topological component corresponding to the optoelectronic processor, while the lower half in FIG. 1 is a topological component of the optoelectronic processor provided in this invention. The topological component of the optoelectronic processor uses the symbol of G.800 middle layer processor topological component, which is not described in details herein.

Figure 2:
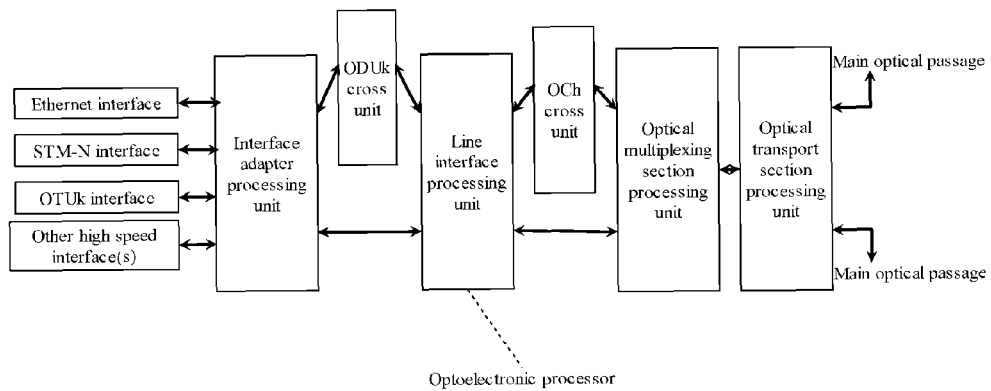
FIG. 2 shows a structural diagram of OTN apparatus model according to the embodiments of this invention.

OTN hierarchy structure has six layers: an optical payload unit (OPU), an optical data unit (ODU), an optical transport unit (OTU), an OCh, an optical multiplex layer (OMS), and an optical transmission section (OTS). FIG. 2 shows a structural diagram of OTN apparatus model according to the embodiments of this invention. As shown in FIG. 2, the corresponding relationship between the six layers and the actual apparatus model is as follows:

An interface adapting processing unit: is used for adapting the signal received from the customer side, loading the signal to the payload of OPU, terminating OPU signal, then loading the terminated OPU signal to the payload of ODU in the adapting manner, and then terminating ODU signal; and is further used for adapting the signal received from the customer side and loading the signal to the payload of ODU, terminating ODU signal, then loading the terminated ODU signal to the ODU payload in the adapting manner, and then terminating ODU signal.

An ODUk cross unit: for dispatching the terminated ODUk signal. Since ODUk has a plurality of layers in ODU layer, the ODUk cross unit is also responsible for adapting, terminating and multiplexing operation among different ODUks layers.

An line interface processing unit: is used for adapting the terminated ODUk signal, loading it to OTUk payload, terminating OTUk signal, then loading the terminated OTUk signal to the payload of OCh in the adapting manner, and then terminating OCh signal, wherein, the line interface processing unit is further used for adapting the terminated OCh signal and loading it to the payload of OCh, terminating OCh signal, then loading the terminated OCh signal to the OTUk payload in the adapting manner, and then terminating OTUk signal.

An OCh cross unit: is used for dispatching the terminated OCh signal.

An optical multiplexing section processing unit: is used for adapting and multiplexing the terminated OCh signal, loading it to the OMS payload, and then terminating the OMS signal.

An optical transport section processing unit: is used for adapting the terminated OMS signal, loading it to the OTS payload, terminating the OTS signal and then transmitting it to the main optical path.

The optoelectronic processor of the embodiments of this invention is described in details hereafter in combination with FIG. 1 and FIG. 2.

The optoelectronic processor according to the embodiments of this invention is located between the ODUk and the OCh layer in FIG. 1, which is corresponding to the line interface processing unit in FIG. 2.

Figure 3:
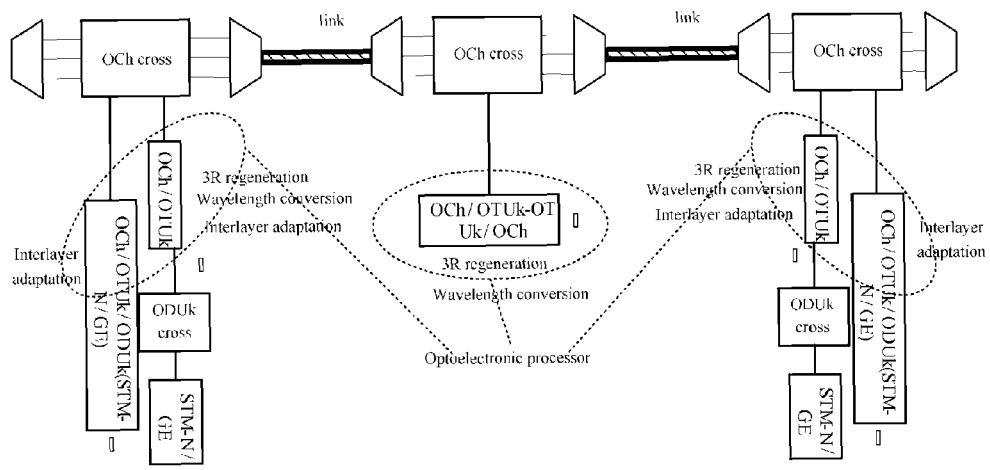
FIG. 3 shows a structural diagram of the optoelectronic processor application apparatus according to the embodiments of this invention.

The main functions of the optoelectronic processor in the OTN apparatus include OCh and ODUk interlayer adapting ability, 3R regenerating ability and wavelength converting ability. FIG. 3 shows a structural diagram of optoelectronic processor application apparatus according to the embodiments of this invention. The model in FIG. 3 can cover all OTN apparatus examples by cropping.

It should be noted that the optoelectronic processor is a model, which cannot be corresponding to a specific appliance completely in the practical application, so that the optoelectronic processor in the described appliance hereafter is corresponding to the function of the optoelectronic processor included in the appliance, not the specific appliance of the optoelectronic processor.

As shown in FIG. 3, the described appliances in FIG. 3 are all models, which do not represent the number of the actual appliances. For example, the appliance ② may be corresponding to a plurality of groups of actual appliances.

The appliances ① and ⑤ process the signal received from the customer side, dispatch and switch the signal to other network elements by OCh cross unit, or converting the OCh signal to the customer signal by a series of reverse termination and adaptation. The appliance comprises the functions of interface adaptation processing unit and line interface processing unit in FIG. 2. The optoelectronic processor cannot be corresponding to a specific appliance in such situation, but is corresponding to the OCh/OTUk/ODUk function in appliances ① and ⑤. For the appliances ① and ⑤, the main function of the optoelectronic processor is the interlayer adapting function of OCh and ODUk.

The appliances ② and ④ converts the OCh signal to ODUk signal by a series of reverse termination and adaptation; or converts the ODUk signal to OCh signal after adaptation and termination. For the appliances ② and ④, the main function of the optoelectronic processor is the interlayer adapting function of OCh and ODUk, the wavelength conversion function and 3R regeneration function. It is described in detail as follows:

if the appliances ②/④ convert the OCh signal to the ODUk signal and further convert the signal to the customer signal through switching to the interface adaptation processing unit by ODUk switching unit, or converting the ODUk signal sealed with customer data to OCh signal and switching the signal by OCh switching unit, the optoelectronic processor in the appliances ②/④ mainly performs the interlayer adapting function of OCh and ODUk;

if the appliances ②/④ convert the OCh signal to the ODUk signal, then directly converts the signal to another group of appliances ②/④ by the ODUk switching unit, and then further converts the signal to the OCh signal for conversion through the OCh switching unit, and if the wavelength of the OCh signal prior to converting to ODUk is the same as the wavelength of the signal that is switched by ODUk and then converts to OCh, the optoelectronic processor in the appliances ②/④ mainly performs 3R regeneration function, and if not the same, the appliances ②/④ mainly performs 3R regeneration and wavelength conversion functions.

The appliance ③ converts the OCh signal to OTUk signal by the reversely terminating and adapting OCh signal, and converts the regenerated OTUk signal to OCh signal by termination and adaptation after the 3R process. For the appliance ③, the main functions of the optoelectronic processor are wavelength conversion function and 3R adapting function. Similar to the appliances ② and ④, if the OCh signal converted by the appliance ③ to OTUk has the same wavelength as the OCh signal converted by OTUk after 3R regeneration, the appliance ③ performs 3R regeneration function; if not the same, the appliance performs wavelength conversion and 3R regeneration functions.

Figure 4:
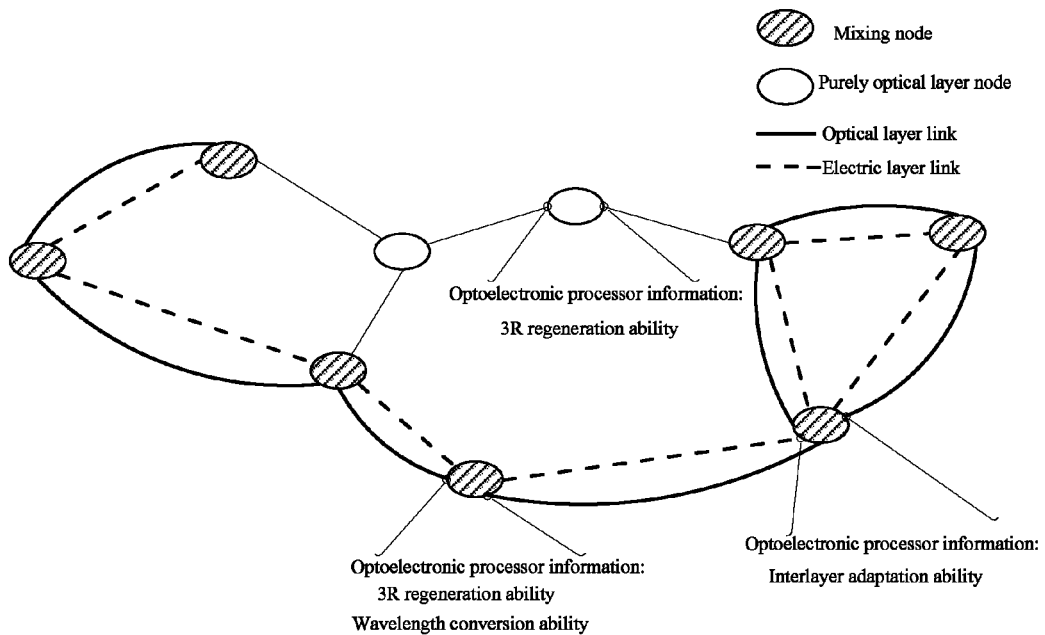
FIG. 4 shows a diagram of optoelectronic processor information in the OTN network model according to the embodiments of this invention.

FIG. 4 shows a diagram of optoelectronic processor information in the OTN network model according to the embodiments of this invention. FIG. 4 shows a typical OTN network topology, wherein white nodes denote pure optical layer node, which indicates that there is no ODUk switching unit in the node apparatus. It is mainly used for long-distance line. The gray nodes are mixed nodes and comprise OCh switching unit and ODU switching unit. The full line is OCh link for loading OCh connection. The dashed line is ODUk line for loading ODUk connection. For there is only OCh cross unit, the purely optical layer node only dispatches the wavelength. Because of the signal deterioration caused by the photo damage after the wavelength transports for a long distance, the signal should be regenerated through 3R regeneration.

The node information and link information are managed respectively when used for OTN network topology management. The link information mainly comprises: interface switching ability (TDM/LSC), link cost, maximal bandwidth, unreserved bandwidth, maximal reserved bandwidth, protection attributes, minimal bandwidth, shared risk link group (SRLG) and so on. The node information mainly comprises node identification (ID). The optoelectronic processor information is used for describing the constraint information between the links, so that it may be managed as node information. For pure optical layer node and optoelectronic mixing node, the main constraint between OCh links is 3R regeneration ability. And, for the optoelectronic mixing node, the constraint between OCh link and ODUk link is OCh and ODUk interlayer adapting ability. The optoelectronic processor information parameter value and the processing manner are described as follows:

Because of using uniform optoelectronic processor information for description, different abilities are described according to the different values of the processor function identification. For example:

in the pure optical node, for there is only 3R regeneration ability between links, the value is as follows:

the processor function identification=3R regeneration|wavelength conversion|interlayer adaptation;

the input wavelength range=the acceptable input wavelength range of the optoelectronic processor, such as lambda 1-lambda 20;

the output wavelength range=the input wavelength range;

the coding format of the wavelength bearer signal=the coding format of the signal, for example, ODU ITU-T G.709;

the rate of the wavelength bearer signal=the actual rate of the signal, such as 10 Gbps;

the using state of the optoelectronic processor represents whether the current optoelectronic processor is in idle state or in working state.

In the mixing nodes, the optoelectronic interlayer adapting ability exists between the optical layer link and the electric layer link, while the 3R regenerating ability and the wavelength converting ability exist between the optical layer links concurrently. Because the same optoelectronic processor is used between pluralities of links, the value is as follows:

the processor function identification=3R regeneration|wavelength switching|interlayer adaptation;

the input wavelength range=the acceptable input wavelength range of the optoelectronic processor, such as lambda 1-lambda 20;

the output wavelength range=the acceptable output wavelength range of the optoelectronic processor, such as lambda 21-lambda 40;

the coding format of the wavelength bearer signal=the coding format of the signal, for example, ODU ITU-T G.709;

the rate of the wavelength bearer signal=the actual rate of the signal, such as 10 Gbps;

the using state of the optoelectronic processor represents whether the current optoelectronic processor is in idle state or in working state.

The 3R regenerating ability: wavelength conversion can be performed only when the coding manner and the rate of the signal loaded in the wavelength are the same as the signal coding manner and rate provided in the optoelectronic processor, wherein after the wavelength signal performs 3R regeneration, the preceding photo damage information will not be accumulated, but needs to be recalculated;

the wavelength converting ability: because of the limitation of the wavelength continuity, when the wavelength cannot ensure continuity on two OCh links, the wavelength needs to be converted through the wavelength conversion function. But it should be noted that when performing O-E-O wavelength conversion function the optoelectronic processor also performs 3R regenerating function. In reverse, when performing 3R regenerating function the optoelectronic processor does not necessarily perform the wavelength conversion function, so that the photo damage information will not be accumulated after the wavelength conversion, but needs to be recalculated. As stated above, the wavelength conversion can be performed only when the coding manner and the rate of the signal loaded in the wavelength are the same as the coding manner and the rate of the signal provided in the optoelectronic processor.

OCh/ODUk interlayer adapting function: when the service signal needs to be uploaded to the OCh signal through ODUk signal, the interlayer adapting ability is required. As stated above, only when the coding manner and the rate of the signal loaded in the wavelength are the same as the coding manner and the rate of the signal provided in the optoelectronic processor, the wavelength conversion can be performed. For example, if the rate of the signal that needs to be connected is ODU2, but the signal rate loaded by the wavelength of the interlayer adapting ability is only ODU1, the service signal cannot be converted from ODUk to OCh. It should be noted that the OCh and ODUk interlayer adapting functions also shows whether to start or stop the calculation of the photo damage. If the service signal is converted to OCh link from ODUk link through ODUk switching, ODUk/OCh conversion and OCh switching, calculation of the photo damage should start; but if the service signal is converted to ODUk link from OCh link through OCh switching, OCh/ODUk conversion and ODUk switching, calculation of the photo damage should stop.

According to the embodiments of the invention, two processing methods for constraint information are provided.

The first method is that the nodes floods the constraint information managed by the optoelectronic apparatus, calculates the route and verifies the constraint information according to the route hop-by-hop; the second method is that the connected source node calculates the route when the nodes and other nodes establish connection, and each node in the route verifies the constraint information respectively. The two methods are described in details hereafter.

The constraint information of the optoelectronic processor is maintained locally, but whether to flood is determined according to the strategy established by connection. It is generally divided into two types: central route calculation and constraint verification, in which the constraint information of the optoelectronic processor is flooded, wherein during the route calculation, the source node calculates route and the route obtained by calculation verifies the constraint information hop-by-hop; the central route calculation and distributed constraint verification, in which the constraint information of the optoelectronic processor is not flooded. The source node calculates the route and the constraint information is verified by each node during the process of establishing connection respectively.

Figure 5:
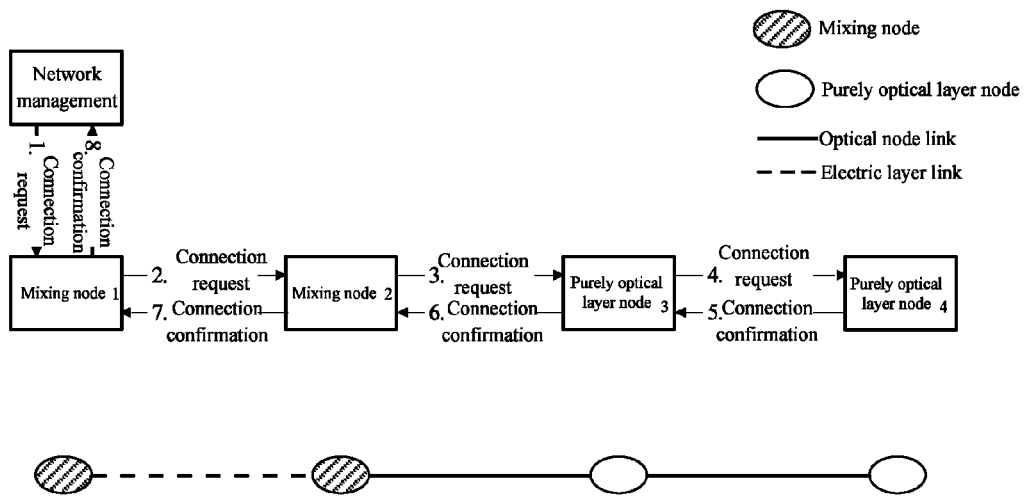
FIG. 5 shows a diagram of the message interaction of the optoelectronic processor information when establishing connection in the OTN network according to the embodiments of this invention.
Figure 6:
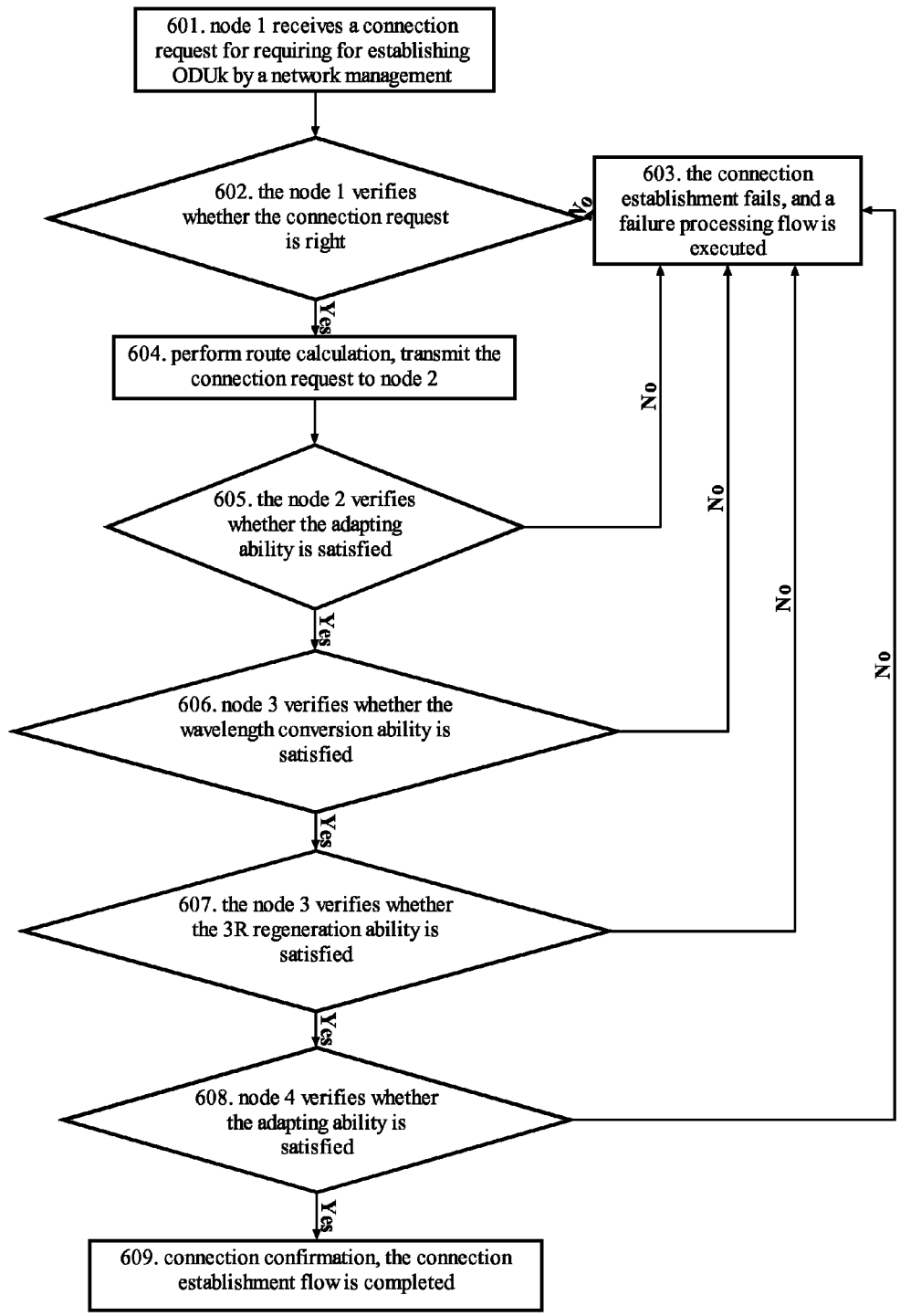
FIG. 6 shows a flowchart of processing optoelectronic processor information when establishing connection according to the embodiments of this invention.

The distinction of the above two types is that: the former verifies all the constraint information at the source node while the latter verifies the constraint information of the node at each node that the connection passes through. The embodiments of this invention describe the latter in details, while the former only replaces the distributed constraint verification with the central constraint verification. FIG. 5 shows a diagram of the message interaction of optoelectronic processor information when establishing connection in the OTN network according to the embodiments of this invention. In FIG. 5, the message interaction for establishing an ODUk connection in OTN network is described. FIG. 6 shows a flowchart for processing of optoelectronic processor information when establishing connection according to the embodiments of this invention. FIG. 6 is used for describing the flow of the central route calculation and distributed constraint verification in the scene of FIG. 5. As shown in FIG. 6, it comprises Steps S601 to S609:

Step 601, the control panel of node 1 receives the message from the webmaster requiring for establishing ODUk connection.

Step 602, node 1 verifies the connection request message, if wrong, executes Step 603, otherwise, executes Step 604.

Step 603, the connection establishment fails, and executes the failure processing flow.

Step 604, route calculation is performed according to the required condition, and connection request is transmitted to node 2 after obtaining the route by calculation.

Step 605, after receiving the connection request message, node 2 verifies whether OCh/ODUk interlayer adapting ability satisfies the connection request parameter. If not, execute Step 603, otherwise, transmit connection request message to node 3.

Step 606, after receiving the connection request message, node 3 first detects the continuity of the wavelength at the node, if the wavelength continuity is not satisfied, checks whether the node has the wavelength converting ability of O-E-O. If it has the ability and it satisfies the parameter requirement of the connection request, execute O-E-O wavelength conversion, otherwise, execute Step 603.

Step 607, if O-E-O wavelength conversion is executed at the node, the photo damage information is not verified, otherwise, it needs to verify whether the photo damage accumulation is out of the limit. If so, detect whether the node has 3R regeneration ability, if it has the regeneration ability and the 3R regeneration ability satisfies the parameter requirement of the connection request, execute 3R regeneration, otherwise, execute Step 603.

Step 608, after receiving the connection request message, node 4 verifies whether OCh and ODUk interlayer adapting ability satisfies the parameter requirement of the connection request. If not, execute Step 603, otherwise, return connection confirmation to node 3.

Step 609, node 3 returns connection confirmation to node 2, node 2 returns connection confirmation to node 1, and finally node 1 returns connection confirmation to the webmaster. The connection establishment flow is completed.

As stated above, in the embodiments, the relative functions for processing between the OCh layer and the ODUk layer in the OTN apparatus is unified by using the optoelectric processor, comprising OCh and ODUk interlayer adapting ability, O-E-O wavelength converting ability, and 3R regenerating ability, which can improve the maintenance and management of relative information in the OTN apparatus. It can describe the topology information of the OTN network well and manage the connection of the OTN network by the uniform optoelectronic processor model.

Obviously, the person skilled in the art should understand that each module or each step in the invention can be implemented by general calculating device, which can be centralized on an individual calculating device, or distributed on the network formed by a plurality of calculating devices. Alternatively, they can be implemented by program code executed by the calculating device such that they can be stored in the storage device for execution by the calculating device, or each step or function can be fabricated into an integrated circuit, or the plurality of modules or steps can be made into a single integrated circuit. Therefore, this invention is not limited to any combination of specific hardware and software.

Above description is only to illustrate the preferred embodiments but not to limit the present invention. Various alterations and changes to the present invention are apparent to those skilled in the art. The scope defined in claims shall comprise any modification, equivalent substitution and improvement within the spirit and principle of the present invention.

What is claimed is:

1. An optoelectronic processing apparatus, applied to an optical transport network OTN device, comprising:
    a reamplifying/reshaping/retiming 3R regeneration unit, adapted to reamplify, reshape and retime a signal;
    a wavelength conversion unit, adapted to perform wavelength conversion to the signal;
    an interlayer adapting unit, adapted to convert the signal between an optical passage OCh layer and an optical data unit ODUk layer; and
    a dispatching unit, adapted to dispatch, according to a function identification parameter of the optoelectronic processing apparatus, the 3R regeneration unit, the wavelength conversion unit, and the interlayer adapting unit to process the signal; and
    wherein the optoelectronic processing apparatus is further adapted to manage and process the signal according to constraint information among links, wherein the constraint information comprises at least one of the followings:
    a processor function identification parameter of the optoelectronic processing apparatus, an input wavelength range, an output wavelength range, a coding format of a wavelength bearer signal, a rate of the wavelength bearer signal and a using status of the optoelectronic processing apparatus.

2. The apparatus according to claim 1, wherein the dispatching unit is adapted to dispatch the 3R regeneration unit to process the signal when the function identification parameter is 3R regeneration, so as to describe the 3R regeneration ability of the optoelectronic processing apparatus.

3. The apparatus according to claim 1, wherein the dispatching unit is adapted to dispatch the wavelength conversion unit to process the signal when the function identification parameter is wavelength conversion, so as to describe the wavelength conversion ability of the optoelectronic processing apparatus.

4. The apparatus according to claim 1, wherein the dispatching unit is adapted to dispatch the interlayer adapting unit when the function identification parameter is optoelectronic interlayer adaption, so as to describe the optoelectronic interlayer adapting ability of the optoelectronic processing apparatus.

5. The apparatus according to claim 1, wherein the optoelectronic processing apparatus is adapted to perform 3R regeneration, wavelength conversion or optoelectronic interlayer adapting function to the signal, when the coding manner and rate of the signal are the same as the coding manner and rate of the wavelength bearer signal.

6. The apparatus according to claim 1, wherein the apparatus further comprises:
    a photo damage calculating unit, adapted to recalculate the photo damage of the signal after the signal is processed by the 3R regeneration unit or the wavelength conversion unit.

7. The apparatus according to claim 6, wherein the photo damage calculating unit is further adapted to start to calculate the photo damage of the signal after switching the signal from an ODUk layer link through an ODUk switching, then converting the signal from the ODUk layer to the OCh layer by the interlayer adapting unit, and then switching the signal from an OCh to an OCh link.

8. The apparatus according to claim 6, wherein the photo damage calculating unit is further adapted to stop calculating the photo damage of the signal after switching the signal from an OCh layer link through an OCh switching, then converting the signal from the OCh layer to the ODUk layer by the interlayer adapting unit, and then switching the signal from the ODUk to the ODUk link.

9. The apparatus according to claim 1, wherein the apparatus further comprises: a photo damage calculating unit, adapted to recalculate the photo damage of the signal after the signal is processed by the 3R regeneration unit or the wavelength conversion unit.

10. The apparatus according to claim 9, wherein the photo damage calculating unit is further adapted to start to calculate the photo damage of the signal after switching the signal from an ODUk layer link through an ODUk switching, then converting the signal from the ODUk layer to the OCh layer by the interlayer adapting unit, and then switching the signal from an OCh to an OCh link.

11. The apparatus according to claim 9, wherein the photo damage calculating unit is further adapted to stop calculating the photo damage of the signal after switching the signal from an OCh layer link through an OCh switching, then converting the signal from the OCh layer to the ODUk layer by the interlayer adapting unit, and then switching the signal from the ODUk to the ODUk link.

12. A method for processing constraint information, comprising that: when a node which a optoelectronic processing apparatus belongs to establishes connection with other nodes, the node floods the constraint information managed by the optoelectronic processing apparatus, calculates a route and verifies the constraint information hop-by-hop according to the route, wherein the optoelectronic processing apparatus is used for managing and processing a signal according to the constraint information between links, and the constraint information comprises at least one of the followings: a processor function identification of the optoelectronic processing apparatus, an input wavelength range, an output wavelength range, a coding format of a wavelength bearer signal, a rate of the wavelength bearer signal, and a using status of the optoelectronic processing apparatus; wherein the optoelectronic processing apparatus comprises: a 3R regeneration unit for reamplifying, reshaping and retiming the signal, a wavelength conversion unit for performing wavelength conversion to the signal, an interlayer adapting unit for converting the signal between the OCh layer and the ODUk layer; and a dispatching unit for dispatching the 3R regeneration unit, the wavelength conversion unit and the interlayer adapting unit according to the function identification parameter of the optoelectronic processing apparatus so as to process the signal.

13. A method for processing constraint information, comprising that: when a node which a optoelectronic processing apparatus belongs to establishes connection with other nodes, a source node of the connection calculates a route and verifies the constraint information by each node in the route, wherein the optoelectronic processing apparatus is used for managing and processing the signal according to the constraint information between links, and the constraint information comprises at least one of the followings: a processor function identification of the optoelectronic processing apparatus, an input wavelength range, an output wavelength range, a coding format of a wavelength bearer signal, a rate of the wavelength bearer signal and a using status of the optoelectronic processing apparatus;
    wherein the optoelectronic processing apparatus comprises: a 3R regeneration unit for reamplifying, reshaping and retiming the signal, a wavelength conversion unit for performing wavelength conversion to the signal, an interlayer adapting unit for converting the signal between the OCh layer and the ODUk layer; and a dispatching unit for dispatching the 3R regeneration unit, the wavelength conversion unit and the interlayer adapting unit according to the function identification parameters of the optoelectronic processing apparatus so as to process the signal.

* * * * *